United States Patent
Henriksen et al.

(10) Patent No.: US 9,411,578 B2
(45) Date of Patent: Aug. 9, 2016

(54) SOURCE CODE VIOLATION MATCHING AND ATTRIBUTION

(71) Applicant: SEMMLE LIMITED, Oxford (GB)

(72) Inventors: Anders Starcke Henriksen, Oxford (GB); Arthur Baars, Oxford (GB); Pavel Avgustinov, Oxford (GB); Julian Tibble, Oxford (GB); Max Schaefer, Oxford (GB); Oege de Moor, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 14/794,280

(22) Filed: Jul. 8, 2015

(65) Prior Publication Data
US 2015/0324195 A1 Nov. 12, 2015

Related U.S. Application Data

(63) Continuation of application No. 14/696,185, filed on Apr. 24, 2015, now Pat. No. 9,262,157.

(60) Provisional application No. 61/983,932, filed on Apr. 24, 2014.

(51) Int. Cl.
*G06F 9/44* (2006.01)
*G06Q 10/06* (2012.01)
(Continued)

(52) U.S. Cl.
CPC .. *G06F 8/71* (2013.01); *G06F 8/43* (2013.01); *G06F 8/75* (2013.01); *G06F 8/77* (2013.01); *G06F 11/3616* (2013.01); *G06Q 10/06398* (2013.01)

(58) Field of Classification Search
CPC .......................................... G06F 8/71
See application file for complete search history.

(56) References Cited

U.S. PATENT DOCUMENTS 8,336,030 B1 * 12/2012 Boissy ...................... G06F 8/71
717/122
2006/0123389 A1 6/2006 Kolawa et al.
(Continued)

FOREIGN PATENT DOCUMENTS

EP 2784665 10/2014

OTHER PUBLICATIONS

European Search Report issued for EP Application Serial No. 15164947.2-1954, dated Sep. 10, 2015, 11 pages.
(Continued)

*Primary Examiner* — Philip Wang
(74) *Attorney, Agent, or Firm* — Fish & Richardson P.C.

(57) ABSTRACT

Methods, systems, and apparatus, including computer programs encoded on computer storage media, for matching and attributing code violations. One of the methods includes receiving a snapshot S of a code base of source code and a different snapshot T of the code base. Data representing first violations in the snapshot S and second violations in the snapshot T is received. Pairs of matching violations are determined using performing two or more matching processes, including performing a first matching process, the first matching process determining first pairs of matching violations according to a first matching algorithm and performing a second matching process, the second matching process determining second pairs of matching violations according to a second matching algorithm from violations not matched by the first matching process. The first pairs of matching violations and the second pairs of matching violations are included in the determined pairs of matching violations.

21 Claims, 14 Drawing Sheets

(51) Int. Cl.
*G06F 11/36* (2006.01)
*G06F 9/45* (2006.01)

(56) References Cited

U.S. PATENT DOCUMENTS

| | | | | | |
|---|---|---|---|---|---|
| 2006/0136863 | A1* | 6/2006 | Szpak | | G06F 8/34 717/104 |
| 2009/0070734 | A1* | 3/2009 | Dixon | | G06F 8/71 717/102 |
| 2009/0113287 | A1* | 4/2009 | Yee | | G06F 17/30902 715/234 |
| 2011/0283270 | A1 | 11/2011 | Gass et al. | | |
| 2013/0305224 | A1 | 11/2013 | Eade et al. | | |
| 2014/0258351 | A1 | 9/2014 | Laron | | |

OTHER PUBLICATIONS

Nicolas Palix et al: "Tracking code patterns over multiple software versions with Herodotos", Proceedings of the Eighth International Conference on Aspect-Oriented Software Development, AOSD '10, Mar. 15, 2010 (201G-03-15), pp. 169-180.

Ayewah et al., "Using Static Analysis to Find Bugs", IEEE Software, vol. 25, No. 5, 2008, 8 pages.

Boogerd et al., "Evaluating the Relation Between Coding Standard Violations and Faults Within and Across Software Versions", Delft University of Technology, Software Engineering Research Group, Technical Report Series, Aug. 2009, 14 pages.

Hunt et al., "A Fast Algorithm for Computing Longest Common Subsequences", Communications of the ACM, vol. 20, No. 5, May 1977, 4 pages.

Johnson et al., "Why Don't Software Developers Use Static Analysis Tools to Find Bugs?" ICSE, 2013, 10 pages.

Kim et al., "Program Element Matching for Multi-Version Program Analyses", MSR, May 2006, 7 pages.

Kim et al., "Which Warnings Should I Fix First?", ESEC-FSE, Sep. 2007, 10 pages.

Kim et al., "When Functions Change Their Names: Automatic Detection of Origin Relationship", WCRE, 2005, 10 pages.

Komondoor et al., "Using Slicing to Identify Duplication in Source Code", SAS, 2001, 18 pages.

Myers, "An O(ND) Difference Algorithm and Its Variations", *Algorithmica*, 1986, 15 pages.

Nagappan et al., "Static Analysis Tools as Early Indicators of Pre-Release Defect Density", ICSE, 2005, 8 pages.

Olague et al., "Empirical Validation of Three Software Metrics Suites to Predict Fault-Proneness of Object-Oriented Classes Developed Using Highly Iterative or Agile Software Development Processes", IEEE TSE, vol. 33, No. 6, 2007, 18 pages.

Śliwerski et al, "When Do Changes Induce Fixes?", MSR, May 2005, 5 pages.

Spacco et al., "Tracking Defect Warnings Across Versions", MSR, May 2006, 4 pages.

Subramanyam et al., "Empirical Analysis of CK Metrics for Object-Oriented Design Complexity: Implications for Software Defects", IEEE TSE, vol. 29, No. 4, 2003, 14 pages.

Vetró, "Using Automatic Static Analysis to Identify Technical Debt", ICSE, 2012, 3 pages.

Vetró et al., "An Empirical Validation of FindBugs Issues Related to Defects", 15th Annual Conference on Evaluation & Assessment in Software Engineering (EASE), Apr. 2011, 11 pages.

Zheng et al., "On the Value of Static Analysis for Fault Detection in Software", IEEE TSE, vol. 32, No. 4, 2006, 14 pages.

* cited by examiner

SOURCE CODE VIOLATION MATCHING AND ATTRIBUTION

CROSS-REFERENCE TO RELATED APPLICATIONS

This application is a continuation application of, and claims priority to, pending U.S. patent application Ser. No. 14/696,185, filed on Apr. 24, 2015, for SOURCE CODE VIOLATION MATCHING AND ATTRIBUTION, which claims priority to U.S. Provisional Patent Application No. 61/983,932, filed Apr. 24, 2014, for SOURCE CODE VIOLATION MATCHING AND ATTRIBUTION. The entirety of the foregoing applications is herein incorporated by reference.

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

Snapshots stored in a version control system can be represented as a directed, acyclical revision graph. Each node in the revision graph represents a commit of the source code. A commit represents a snapshot as well as other pertinent information about the snapshot such as the author of the snapshot, and data about ancestor commits of the node in the revision graph. A directed edge from a first node to a second node in the revision graph indicates that a commit represented by the first node is a previous commit than a commit represented by the second node, and that no intervening commits exist in the version control system.

SUMMARY

This specification describes how a static analysis system can find matching violations between a snapshot S of a source code base and a snapshot T of the source code base. The snapshots are not necessarily adjacent in the revision graph. The system can then use the matching violations to attribute, to individual revisions, individual developers, or teams of developers, violations introduced and removed between the snapshots S and T. From the violations introduced and removed, the system can generate developer fingerprints that are characteristic of the tendency of individual developers to introduce and remove violations of certain types.

Particular embodiments of the subject matter described in this specification can be implemented so as to realize one or more of the following advantages. Violations being introduced and removed can be accurately attributed to developers. Violations can be matched between snapshots even when additional source code has been added and even when violations have been moved between source code files. Violations can also be attributed even for merge commits and in the presence of unanalyzable snapshots.

Violation attribution can be used to improve team performance by helping to analyze the progress of status of a project. Violation attribution can help guide the selection of developers for various training programs and team assignments. Violation attribution also gives general insight into the software engineering process. Violation attribution can guide code reviews by drawing attention to common violations introduced by team members. Team performance can further be improved by reducing the number of violations that are introduced and by increasing the number of violations that removed. The ability for developers to see precisely which violations they have introduced and removed can drive developer motivation and self-improvement.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
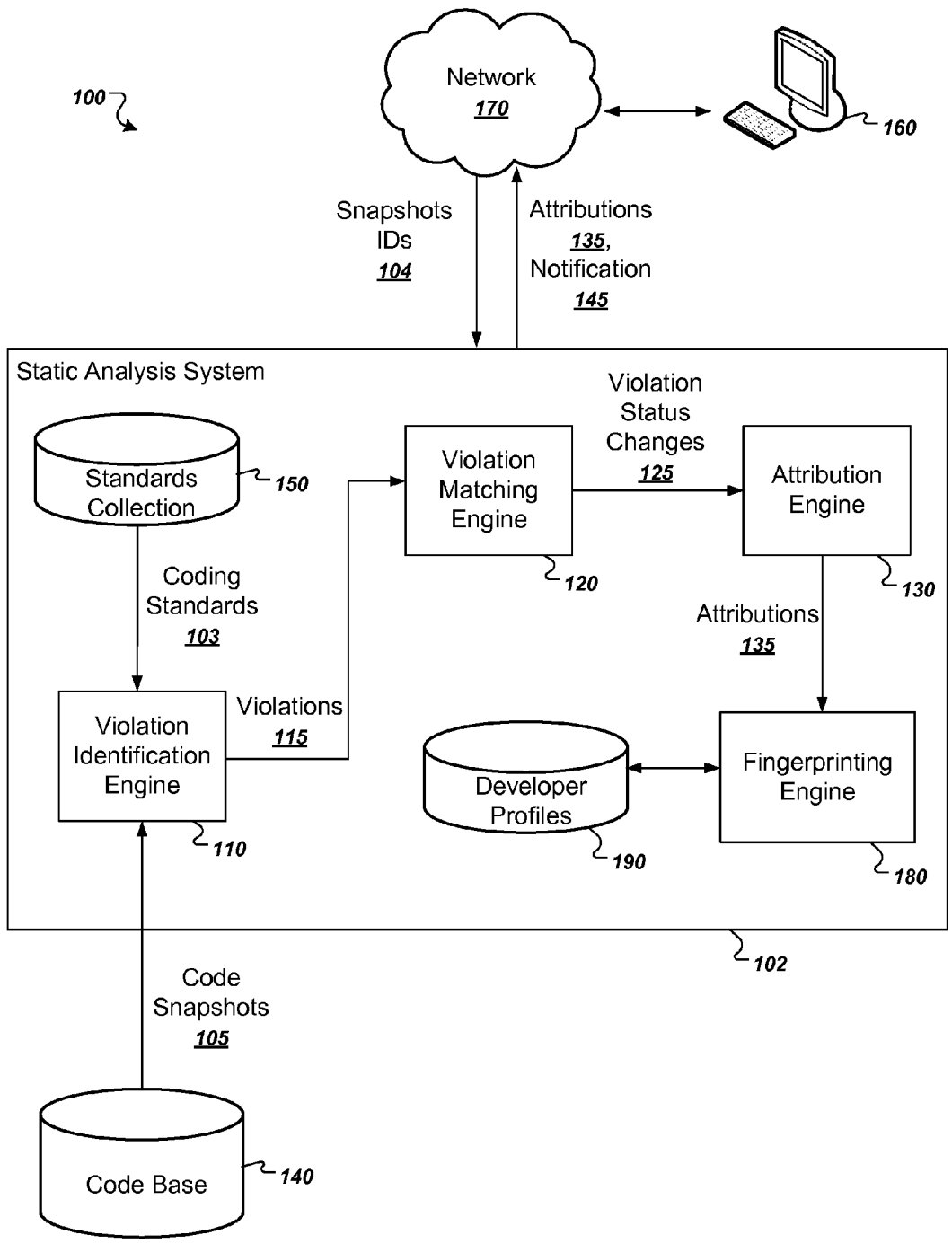
FIG. 1 illustrates an example system.

Static analysis can be performed on a code base, which may be referred to as a project. The project generally includes a collection of source code files organized in a particular way, e.g., arranged in a hierarchical directory structure, with each source code file in the project having a respective path.

Static analysis techniques include techniques for identifying violations of coding standards. In the systems described below, violations will be represented by data elements that will also be referred to simply as violations when the meaning is clear from context.

A static analysis system can use any appropriate set of coding standards for identifying violations, e.g., the NASA Jet Propulsion Laboratory Institutional Coding Standard for the Java Programming Language, available at http://lars-lab.jpl.nasa.gov/JPL JPL_Coding_Standard_Java.pdf. The types of violations that a static analysis system can identify include correctness standards on coding concurrent processes, maintainability standards on eliminating duplicate code segments, readability standards on reducing code complexity, and framework standards on using code libraries, to name just a few examples.

In Table 1, below, is an example segment of source code that contains a violation. The line numbers refer to line numbers of an example source code file.

TABLE 1

```
127 Set<String> revs;
...
162 for (IRevision rev : new ArrayList<IRevision>(keep)) {
163     if (!revs.contains(rev)) {
...
179     }
180 }
```

On line 127, the variable "revs" is declared to be of type "Set<String>". In other words, "revs" is a set of data elements that are character strings. On line 162, the variable "rev" is declared to be of type "IRevision."

On line 163, the source code checks whether the IRevision element "rev" is contained in the string set "revs." This requires a comparison between data elements that are strings and data elements that are of type "IRevision." Thus, the check on line 163 violates a coding standard that comparisons must only performed between variables of the same type. In fact, the check on line 163 will likely always return "false," and thus must be corrected by a developer in order for the program to operate correctly.

A violation data element for a violation in a project can include data representing a snapshot, S, a location, l, and a violation type, t. The location l will delineate the source code that violates the applicable coding standard. The source code that violates the standard, or "violation snippet," will generally be a contiguous segment of source code; however, in some cases, it may be two or more disconnected segments of source code and the location l will specify all of the corresponding segments. Similarly, the source code will generally be found in one source code file, but may be found in two or more source code files.

The location l of a particular source code violation can be specified by a path of a source code file that includes the particular violation, as well as a start position and an end position of the violation snippet or, if the violation snippet includes multiple segments of source code, multiple start positions and end positions of the multiple segments within the file. Typically, the start and end positions within a file are represented by starting and ending line numbers within the file as well as an offset within the line, e.g., a column number or an offset that specifies a number of characters or bytes. For example, a violation data element representing the example violation illustrated above would have a violation snippet "revs.contains(rev)", and a location l that specifies a path of the example file, a beginning line 163 with beginning offset 10, and an ending line 163 with ending offset 28. The start and end positions can also be given by a byte offset within the file as a whole. Additionally, rather than an absolute end position, the end position could be specified as an offset from the start position of the violation.

A violation data element also has a type that indicates what sort of violation the violation is. For example, a violation representing the example violation illustrated above would have a type that indicates that the violation snippet violates a coding standard that forbids comparing data elements that have different types.

Two violations match each other if they refer to the same defect in their respective code bases. In other words, a violation v in a first snapshot S matches a violation w in a second snapshot T if v refers to the same defect in the snapshot S as w does in the snapshot T. A static analysis system can determine which violations in S match those in T. Given a set V of violations in S, and a set W of violations in T, a static analysis system can determine a set M of violations in V that have a matching violation in W, and a set N of violations in W that have a matching violation in V. The static analysis system can further require that no two elements of M match the same violation in W, and that no two elements of N match the same violation in V. The static analysis system can also determine a set P of violations that occur in V but do not match any violation in W, and a second set Q of violations that occur in W but do not match any violation in V.

A static analysis system can determine status changes of violations in one particular snapshot relative to another snapshot. In this specification, reference will be made to determining status changes of violations by comparison between a first snapshot S and a second snapshot T. The snapshot S may represent the source code files of the project at an earlier point in time than the snapshot T. The snapshot S and the snapshot T may also have a parent/child relationship in a revision graph. A first snapshot is a "parent" of a second snapshot when a commit of the first snapshot is a parent in the revision graph of a commit of the second snapshot. Similarly, a first snapshot is a "child" of a second snapshot when a commit of the first snapshot is a child in the revision graph of a commit of the second snapshot.

However, snapshots being compared need not have any particular relationship at all. In fact, the snapshot T may represent an earlier snapshot of the project than the snapshot S. The snapshot S and the snapshot T may be illustrated as adjacent in a revision graph; however, this is not required.

Status changes include the introduction of violations that were introduced in the snapshot T relative to the snapshot S as well as the removal of violations that were removed from the snapshot S relative to the snapshot T. Generally, violations that were introduced in the snapshot T relative to S are violations that occur in the snapshot T but do not occur in the snapshot S. Conversely, violations that were removed from the snapshot S relative to T are violations that occur in the snapshot S but do not occur in the snapshot T.

In a common situation where the snapshot S and the snapshot T are from the same code base, and the snapshot S is a sole parent of the snapshot T in a revision graph, the set M represents the set of violations in S that were uncorrected in the code base between the snapshots S and T; the set P represents the set of violations in S that were removed from the code base in snapshot T; and, the set Q represents the set of violations that were introduced into the code base in snapshot T.

In this specification, the term "matching violation" may be used to refer to a violation in a snapshot S, a violation in a snapshot T, or to a pair of corresponding violations in the snapshots S and T, which will be apparent from the context.

Because pairs of matching violations represent the same code defect, pairs of matching violations have the same type. However, matching violations may, but need not, have identical violation snippets. Similarly, matching violations may, but need not, occur at a same location within a file in the snapshot S and the snapshot T. Likewise, matching violations may, but need not, occur within a same file in the snapshot S and the snapshot T.

A static analysis system can attribute violation status changes to a particular snapshot or to a particular developer by determining which violations match each other. In the case described above, when S is a sole parent of T, the removal of the violations in P and the introduction of the violations in Q could be attributed to snapshot T, or to the developer or team of developers responsible for snapshot T. There are also other circumstances in which a set of violations may be attributed to a snapshot or to a developer, which will be described in more detail below. A "developer" in this context may actually refer to a group or team of developers responsible for the snapshot T.

After attributing violation status changes, the system can generate individual developer fingerprints that are representative of the types of violations typically introduced or removed by the developer. The system can use the fingerprints to analyze team performance, set goals, and guide improvement plans through training or team selection.

FIG. 1 illustrates an example system 100. The system 100 includes a user device 160 in communication with a static analysis system 102 over a network 170. The static analysis system 102 includes several functional components, including a violation identification engine 110, a violation matching engine 120, and a violation attribution engine 130. The components of the static analysis system 102 can be implemented as computer programs installed on one or more computers in one or more locations that are coupled to each through a network.

A user of user device 160 can initiate static analysis of snapshots of the code base 140. The user device 160 can communicate with the static analysis system 102 over the network 170, which can be any appropriate communications network, e.g., an intranet or the Internet. For example, a user of user device 160 can specify snapshot identifiers 104 of two or more snapshots for analysis. Alternatively, the static analysis system 102 can be installed in whole or in part on the user device 160.

The user of user device 160 can also communicate with the static analysis system 102 in order to specify or customize the coding standards that define coding violations in a standards collection 150.

Upon the user of user device 160 specifying the snapshots 104 for static analysis, the violation identification engine 110 receives the selected snapshots 105 from the code base 140, e.g., a parent snapshot and a child snapshot.

The violation identification engine can then retrieve coding standards 103 from the standards collection 150 to identify violations 115 that occur in the snapshot S and the snapshot T. Alternatively, the violations 115 can be obtained from other sources.

The violation matching engine 120 receives data representing the violations 115 from the violation identification engine 110. The violation matching engine 120 determines which of the violations 115 are matching violations between the snapshot S and the snapshot T. In other words, the violating matching engine 120 determines pairs of the violations 115 that match between the snapshots.

The violation matching engine 120 then determines violation status changes 125, which relate to violations 115 that are not matching violations. In particular, the violation status changes 125 will generally include the introduction of violations into the snapshot T and the removal of violations from the snapshot S.

The attribution engine 130 receives the violations status changes 125 from the violation matching engine 120 and attributes the violation status changes to a particular developer or to a particular snapshot. At this point, the static analysis system 102 can provide the attributions 135 of the violation status changes back to the user device 160, e.g., over the network 170.

A fingerprinting engine 180 can receive the attributions 135 and compute or update fingerprints for individual developers that characterize violations typically made by each developer, typically corrected by each developer, or both. The fingerprinting engine 180 can store the fingerprints in a collection of developer profiles 190.

The fingerprinting engine 180 can analyze the fingerprints generated for each individual developer and, if certain criteria are met, generate a notification 145 to be provided back to the user device 160. For example, the notification 145 can notify a user of the user device 160 that a particular developer introduces violations of a particular type at a rate higher than the developer's team members. The fingerprinting engine 180 may also initiate some other automated action, e.g., generating an automatic invitation that invites the particular developer to a training session regarding violations of that particular type.

Figure 2A:
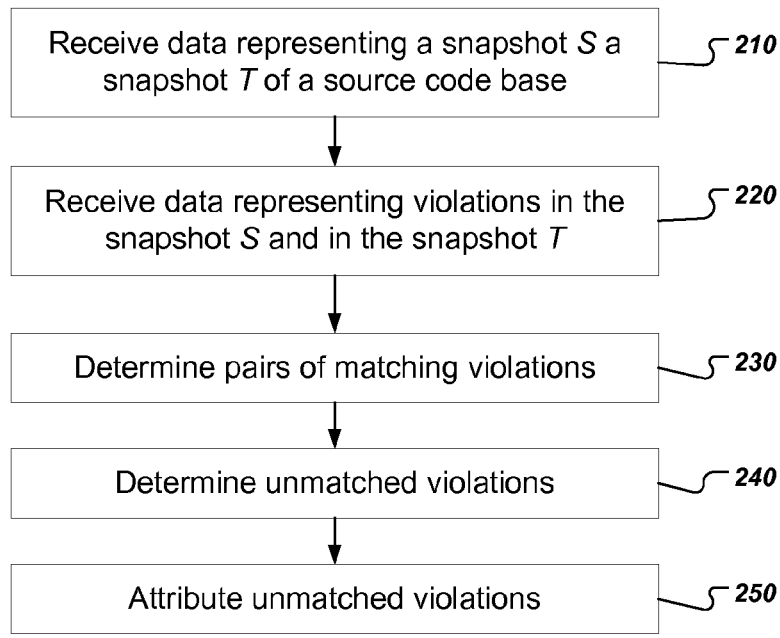
FIG. 2A is a flow chart of an example process for attributing violation status changes.

FIG. 2A is a flow chart of an example process for attributing violation status changes. The process can be implemented by one or more computer programs installed on one or more computers. The process will be described as being performed by an appropriately programmed system of one or more computers, e.g., the static analysis system 102 of FIG. 1.

In general, a static analysis system receives data identifying violations in a snapshot S and a snapshot T of a project. The system then determines matching violations and uses the matching violations to attribute violation status changes.

The system receives data representing a snapshot S and a snapshot T of a code base (210). The data includes data representing paths of source code files in each snapshot. The data may, but need not, include all of the actual source code of each snapshot.

The data representing the snapshots can include data about which files of the snapshot S correspond to files of the snapshot T. For example, if some files from the snapshot S were moved to a new directory or simply renamed in the snapshot T, the data can include cross-reference data representing a correspondence of paths for files in the snapshot S and files in the snapshot T. Two files having corresponding paths can be referred to as files having "matching paths." In some implementations, the system by default considers files to correspond if they have a same path in the snapshot S and in the snapshot T.

The system receives data representing violations in the snapshot S and in the snapshot T (220). The data representing the violations includes, for each violation, data representing a snapshot, a location, and a type. The data also includes the source code that corresponds to the violation.

In some implementations, the system determines the violations by analyzing source code from the snapshot S and the snapshot T. However, the system may also receive the data representing the violations from another source, e.g., as uploaded by a user, or as generated by a separate static code analyzer.

The system determines pairs of matching violations (230), i.e., categorizes particular pairs of violations as matching each other. In general, the system can compare each violation in the snapshot S with each violation in the snapshot T having the same type using one or more matching tests to determine whether the violations are matching violations. Once a pair of violations are determined to be matching violations, the system need not subject the violations to additional tests and can remove the violations from consideration. In addition, the system performs some matching tests only on violations that occur in corresponding files in each snapshot.

Figure 2B:
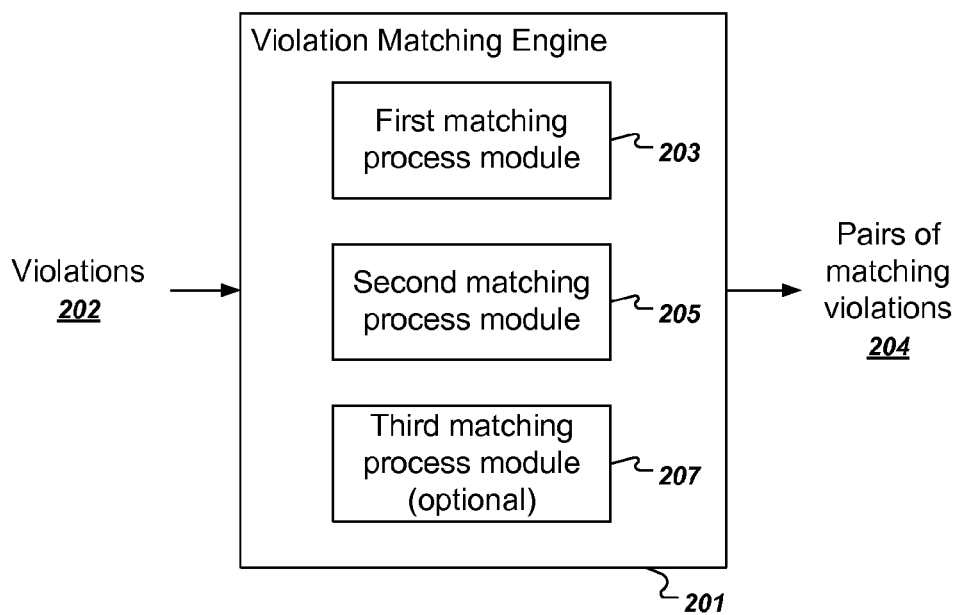
FIG. 2B is a block diagram of an example violation matching engine.

FIG. 2B is a block diagram of an example implementation 201 of a violation matching engine 120. This violation matching engine implementation 201 includes a first matching process module 203, a second matching process module 205, and an optional third matching process module 207. The violation matching engine implementation 201 receives violations 202 and generates pairs of matching violations 204. In some implementations, the violation matching engine 201 applies each violation matching process in sequence, with each subsequent process operating only on violations that have not yet been matched. The system can also perform the matching processes in different orders, or, alternatively, in parallel, in which case if any of the tests identifies two violations as matching violations, the two violations are included in the set of matching violations. Determining matching violations will be described in more detail below with reference to FIG. 4A.

The system determines unmatched violations (240), i.e., identifies violations that are not matching violations. The system determines both violations in the snapshot S that do not have a corresponding matching violation in the snapshot T as well as violations in the snapshot T that do not have a corresponding matching violation in the snapshot S. The unmatched violations are violations that correspond to a status change between the snapshot S and the snapshot T.

Figure 3:
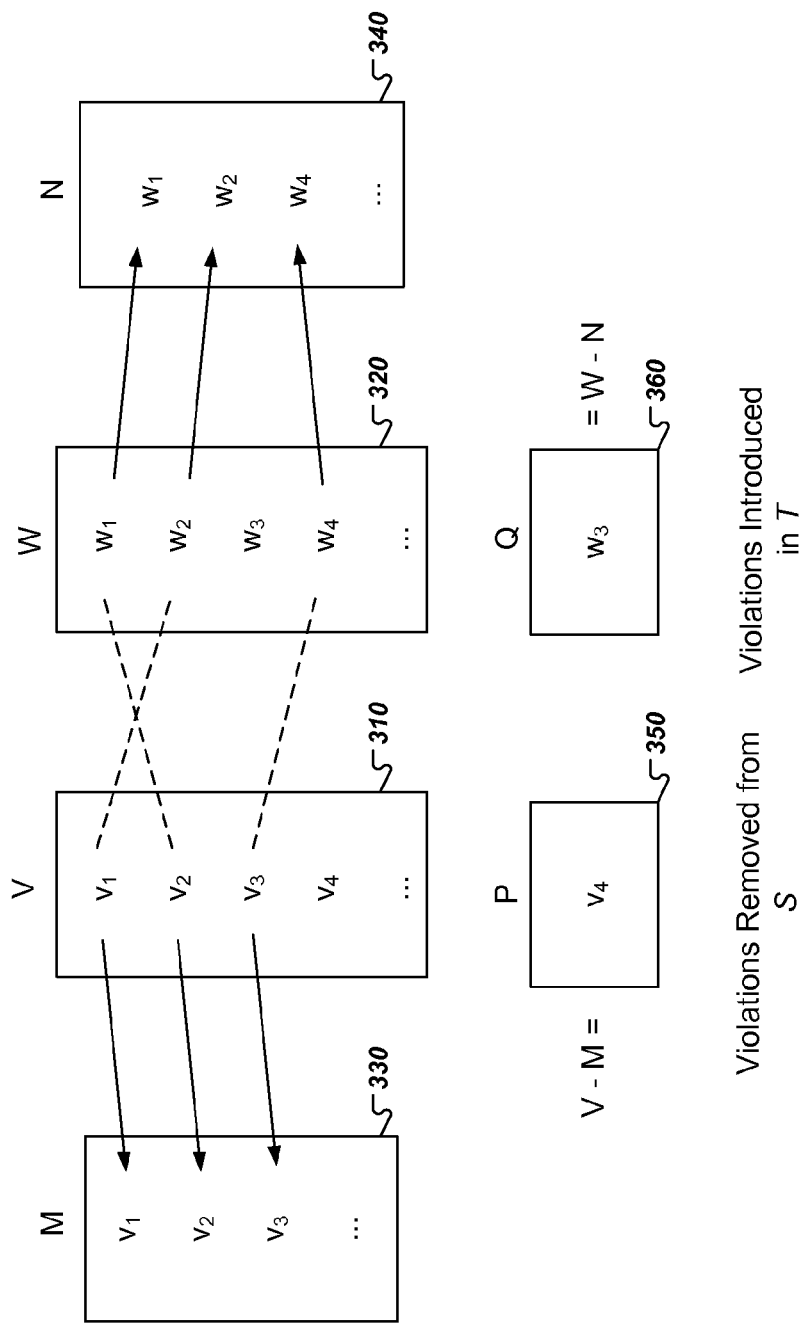
FIG. 3 illustrates determining unmatched violations.

FIG. 3 illustrates determining unmatched violations. In some implementations, the system maintains a set V 310 of violations in the snapshot S and a set W 320 of violations in the snapshot T. The system then determines matching violations. In FIG. 3, matching violations between V and W are indicated by the dashed lines.

When a violation in S matches a violation in T, the system adds the violation in S to a set M 330 of matched violations in S. Similarly, when a violation in T matches a violation in S, the system adds the violation in T to a set N 340 of matched violations in T.

The system can then determine a set 350 of unmatched violations in S by computing a set difference $P=V-M$ between the set V 310 and the set M 330. Likewise, the system can determine a set 360 of unmatched violations in T by computing a set difference $Q=W-N$ between the set W 320 and the set N 340.

In some implementations, the system removes matching violations from the set V 310 and from the set W 320 as the system finds the matching violations. Thus, after performing all the matching tests on all the violations, the altered set V 310 will be the set 350 of unmatched violations in S, and the altered set W 320 will be the set 360 of unmatched violations in T.

The system can also designate violations as matching violations in other ways. For example, the system can leave the set V 310 and the set W 320 the same but annotate each matching violation in S with a matching violation in T and vice versa.

As shown in FIG. 2A, the system attributes the unmatched violations to a revision or a developer or both (250). As described above, the unmatched violations in S may represent violations removed from the snapshot S, and the unmatched violations in T may represent violations introduced in the snapshot T.

The system can attribute a status change of an unmatched violation to a particular snapshot or to a particular developer or both. Typically, the system attributes status changes of violations to the snapshot T, or to the developer who was responsible for the snapshot T in the version control system. There are exceptions, which will be discussed in more detail with reference to FIGS. 9-13.

Figure 4A:
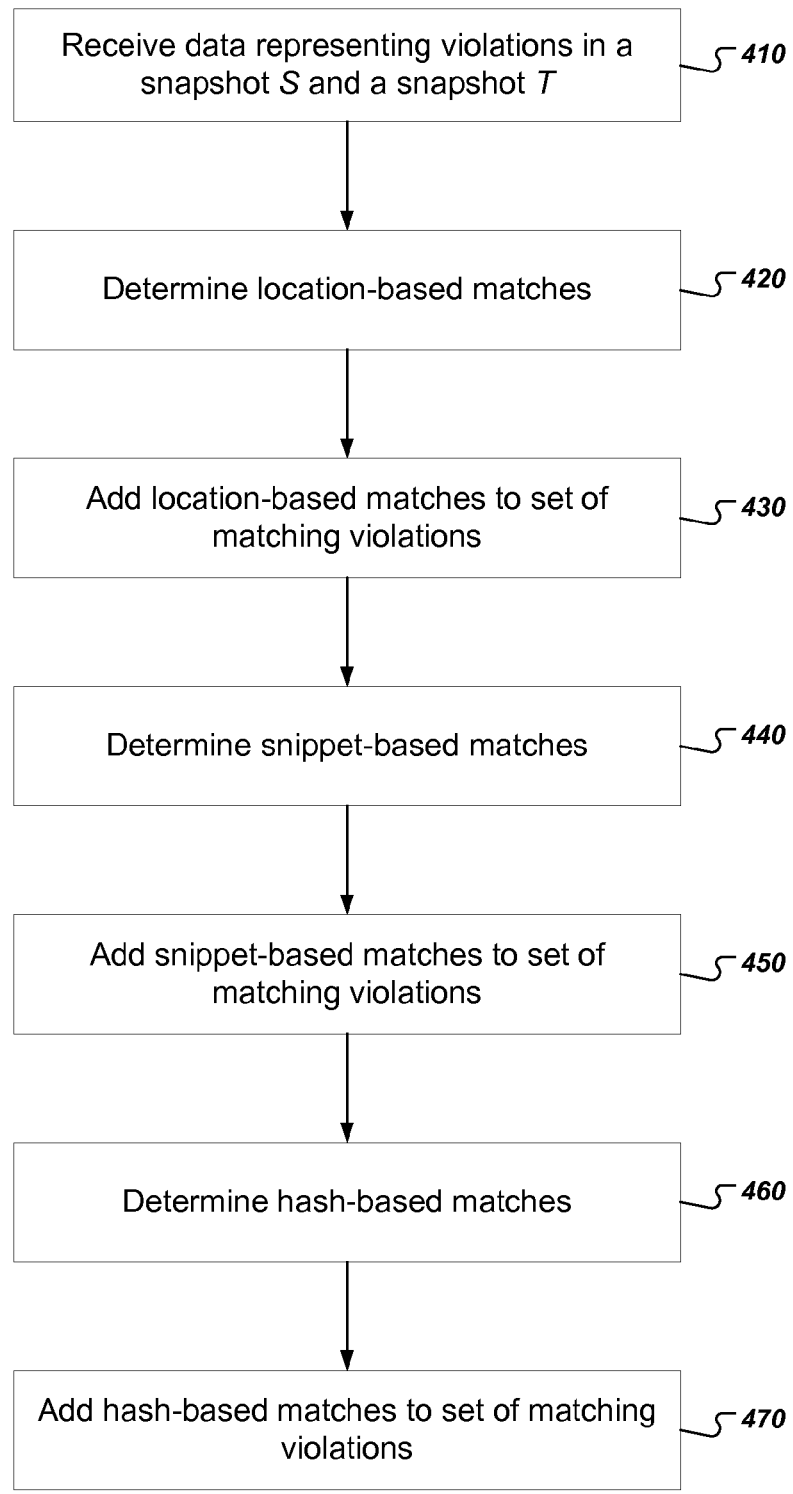
FIG. 4A is a flow chart of an example process for determining matching violations.

FIG. 4A is a flow chart of an example process for determining which violations match each other. The process can be implemented by one or more computer programs installed on one or more computers. The process will be described as being performed by an appropriately programmed system of one or more computers, e.g., the violation matching engine 120 of FIG. 1.

In general, a system receives data representing violations in a snapshot S and violations in a snapshot T. The system then performs a number of pair-wise matching tests between the violations.

In the process as illustrated, the system performs three matching tests in succession. The system performs location-based matching tests, snippet-based matching tests, and hash-based matching tests. Thus, the system can analyze all violations using a particular family of matching tests before analyzing violations with a different family of matching tests. Optionally, the system can perform only two matching tests, or the process can perform more than two matching tests. The system can also perform the matching tests in a different order than the one illustrated, or, alternatively, in parallel, in which case if any of the tests identifies two violations as matching violations, the two violations are included in the set of matching violations.

As violations are matched, the system adds the matching violations to sets of matching violations. Violations that are already designated as matching can be removed from further consideration by other matching tests. In addition, violations having different types need not be tested. In other words, the system can skip performing matching tests for violations having different types.

The system receives data representing violations in a snapshot S and violations in a snapshot T (410). As described above, each violation is represented at least by a type, and a location, which includes a path and starting and ending points of the violation delineating a segment of source code of the violation.

The system determines location-based matches (420). In general, two violations are a location-based match if they occur in corresponding files in each snapshot and occur at a same or a similar location within a pair of corresponding line ranges, as will now be described in more detail.

Figure 5:
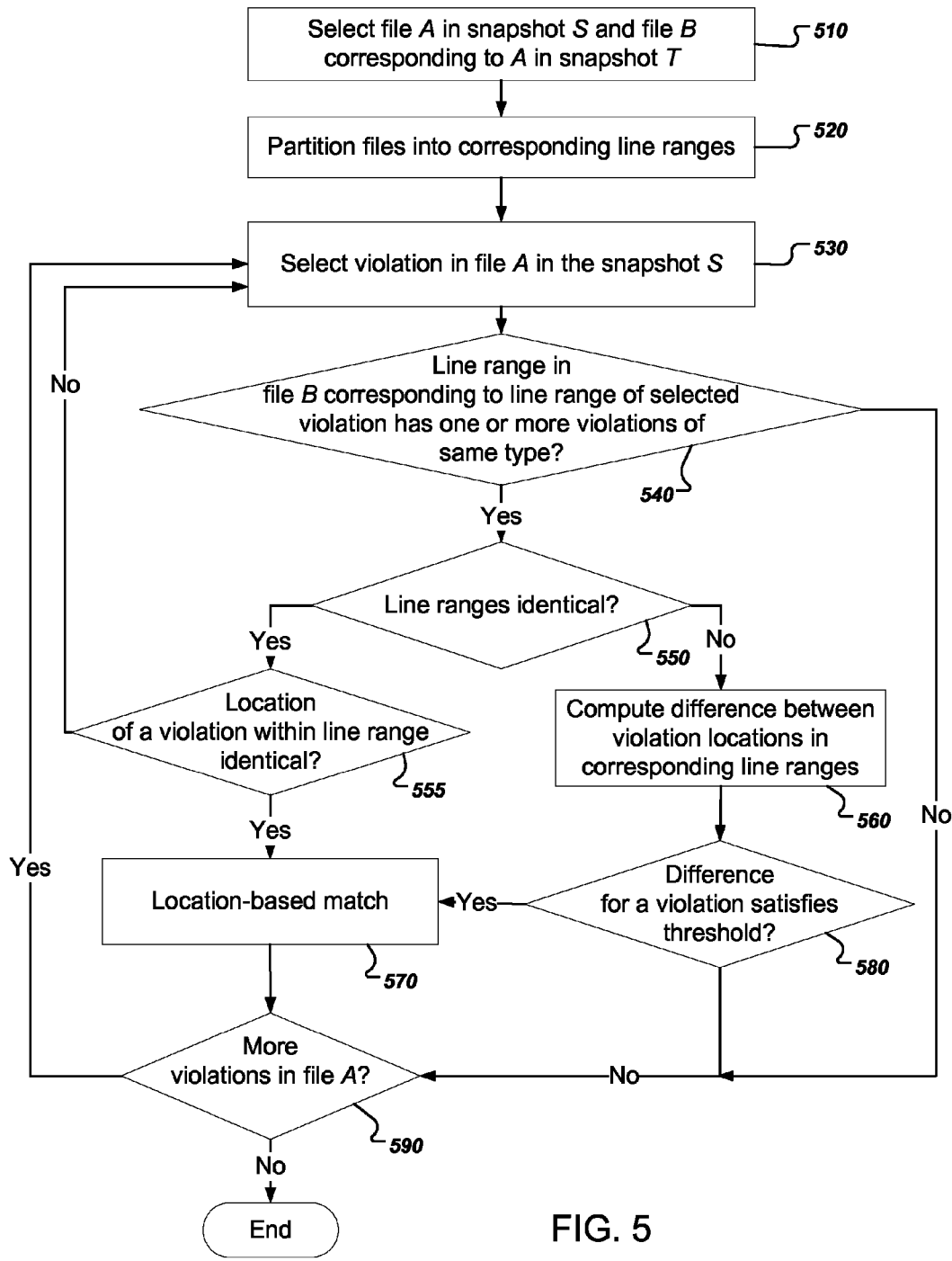
FIG. 5 is a flow chart of an example process for determining location-based matches.

FIG. 5 is a flow chart of an example process for determining location-based matches. The process will be described as being performed by an appropriately programmed system of one or more computers, e.g., the violation matching engine 120 of FIG. 1.

The system selects a file A in the snapshot S and a file B that corresponds to A in the snapshot T (510). In some implementations, to be a location-based match, two violations must occur in files that correspond to each other in the snapshots. Thus, to select pairs of violations to compare, the system can first select a pair of corresponding files from the snapshot S and the snapshot T. Thus, if a file in one snapshot does not have a corresponding file in the other snapshot, the system can skip the file. The system may also skip files if neither or only one of the corresponding files includes violations.

The system partitions the files into corresponding line ranges (520), i.e., line ranges that correspond with each other. In some implementations, the line ranges are non-overlapping.

The system can use any appropriate diffing algorithm to partition the files into corresponding line ranges. For example, the system can invoke a diffing method that performs the Myers diffing algorithm, which is described in more detail in Eugene W. Myers, *An O(ND) Difference Algorithm and Its Variations*, Algorithmica, 1 (2): 251-266, 1986, or one that performs the Hunt-Szymanski diffing algorithm, which is described in more detail in James W. Hunt and Thomas G. Szymanski, *A Fast Algorithm for Computing Longest Common Subsequences*, Communications of the ACM, 20(5), 1977.

In some implementations, the system dynamically chooses between the Myers diffing algorithm and the Hunt-Szymanski diffing algorithm. The system can compute a measure of identical lines between the files. If the measure satisfies a threshold, e.g., 90% identical, 95% identical, or 99% identical, the system chooses the Myers algorithm. Otherwise, the system chooses the Hunt-Szymanski algorithm.

Figure 6:
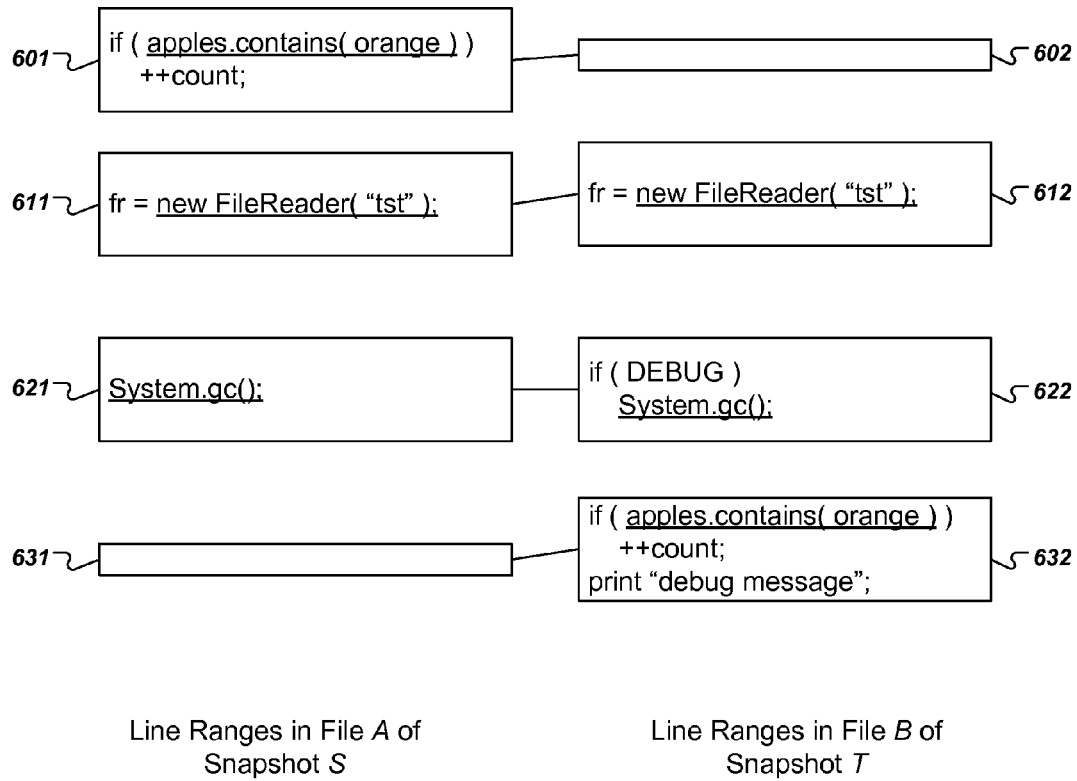
FIG. 6 illustrates files partitioned into corresponding line ranges.

FIG. 6 illustrates files partitioned into corresponding line ranges. The line ranges on the left are line ranges from the file in the snapshot S. The line ranges on the right are line ranges from the corresponding file in the snapshot T. In FIG. 6, the source code that is part of the violation, the violation snippets, are indicated by underlining. Although no line range in FIG. 6 contains more than one violation, this is not always the case. Some line ranges may contain multiple violations. In general, line ranges can contain zero or more violations.

The diffing algorithm outputs corresponding line ranges. The line range 601 corresponds to the line range 602, which is empty. The line range 611 corresponds to the line range 612. The line range 621 corresponds to the line range 622, and the line range 631 corresponds to the line range 632.

As shown in FIG. 5, the system selects a violation in file A in the snapshot S (530). The system can iterate over violations in the file A from the snapshot S, attempting to find matching violations in the file B from the snapshot T. The selected violation will have a particular line range in the file A as determined by the diffing algorithm.

The system determines whether a line range in file B corresponding to the line range of the selected violation has one or more violations of the same type (540). If the corresponding line range does not have one or more violations of the same type, the system can select a next violation from the file A (branch to 590).

In FIG. 6, for example, the line range 601 has a violation, indicated by underlining. However, the line range 601 corresponds to the line range 602, which does not have a violation. Thus, the system can skip location-based matching for the line range 601 and the line range 602.

On the other hand, if the corresponding line range does have one or more violations of the same type, the system determines whether the corresponding line ranges are identical (branch to 550). For example, in FIG. 6, the line range 611 has a violation and corresponds to the line range 612 that does have a violation of the same type. Thus, the system can determine whether the line range 611 and the line range 612 are identical.

In general, the system considers violations that occur in corresponding line ranges to be location-based matches if the respective locations of the violations within the corresponding line ranges differ by a threshold amount or less. The threshold amount can be specified in terms of a number of lines or a number of characters, for example.

In some implementations, the threshold amount changes depending on whether the source code delineated by the corresponding line ranges is identical or not. If the line ranges are identical, the system can use a smaller threshold, e.g., zero lines or zero characters, than a threshold used when the line ranges are not identical, e.g., greater than zero lines or characters. For example, the system can use threshold for line ranges that are not identical that is one, three, or ten lines of code.

The system determines whether the corresponding line ranges are identical (550). For example, in FIG. 6, the line range 611 and the line range 612 are identical.

If the line ranges are identical, the system determines whether the locations of a violation within the line ranges are identical (branch to 555). In other words, the system determines whether the locations of the violations differ by a threshold set to zero characters or zero lines. As described above, a violation data element has location data that delimits code of the violation, e.g., a starting line and an ending line. The system can use the location data within a line range for a violation to determine whether the location of the violations within their respective line ranges is identical, e.g., a same starting line and ending line within the line range. In some implementations, the system requires column or byte offset data of the locations to also be identical between the two violations. In other words, the locations of the violation snippets must be identical character-by-character, and not merely identical line-by-line.

If the corresponding line range in file B has multiple violations of the same type, the system determines whether any of the multiple violations have an identical location within the line range.

If the location of the violations within their respective line ranges is identical, the system determines that the violation from the file A and the violation having the identical location is a location-based match (branch to 570). For violations that match, the system typically removes them from further consideration or matching analysis. The system then determines whether there are more violations in the file A (590).

If the line ranges were not identical (550), the system computes the difference between the locations of the violations within the corresponding line ranges (branch to 560). For example, the system can compute the difference between a starting line number of a violation within a line range of the file A and respective starting line numbers of one or more violations within the corresponding line range of the file B.

For example, in FIG. 6, the violation in the line range 621 starts on line 1 of the line range 621. The violation in the corresponding line range 622 starts on line 2 of the line range 612. Thus, the difference between the violation locations in the corresponding line ranges is one line.

As shown in FIG. 5, the system determines whether the difference for a violation satisfies a threshold (580). If the difference satisfies a threshold, e.g., is within a line or is less than two lines, three lines, or five lines, the system designates the pair of violations as a location-based match (branch to 570).

If none of the respective differences for the violations from the corresponding line range of file B satisfy the threshold, the system does not designate the violations as a location-based match and determines whether there are more violations in the file A for comparison (branch to 590). If so, the system selects a next violation in the file A (branch to 530). If not, the process ends. The system can then repeat the process shown in FIG. 5 for all pairs of corresponding files between the snapshot S and the snapshot T.

As shown in FIG. 4A, the system adds the location-based matches to a set of matching violations (430). As described above, the system can move the matching violations into sets of matching violations or otherwise designate the violations as matching.

If all violations have been analyzed using location-based matching tests, the system determines whether there are any snippet-based matches (440). In general, two violations are a snippet-based match if they occur in corresponding files between the snapshots and if they have identical violation snippets.

Figure 7:
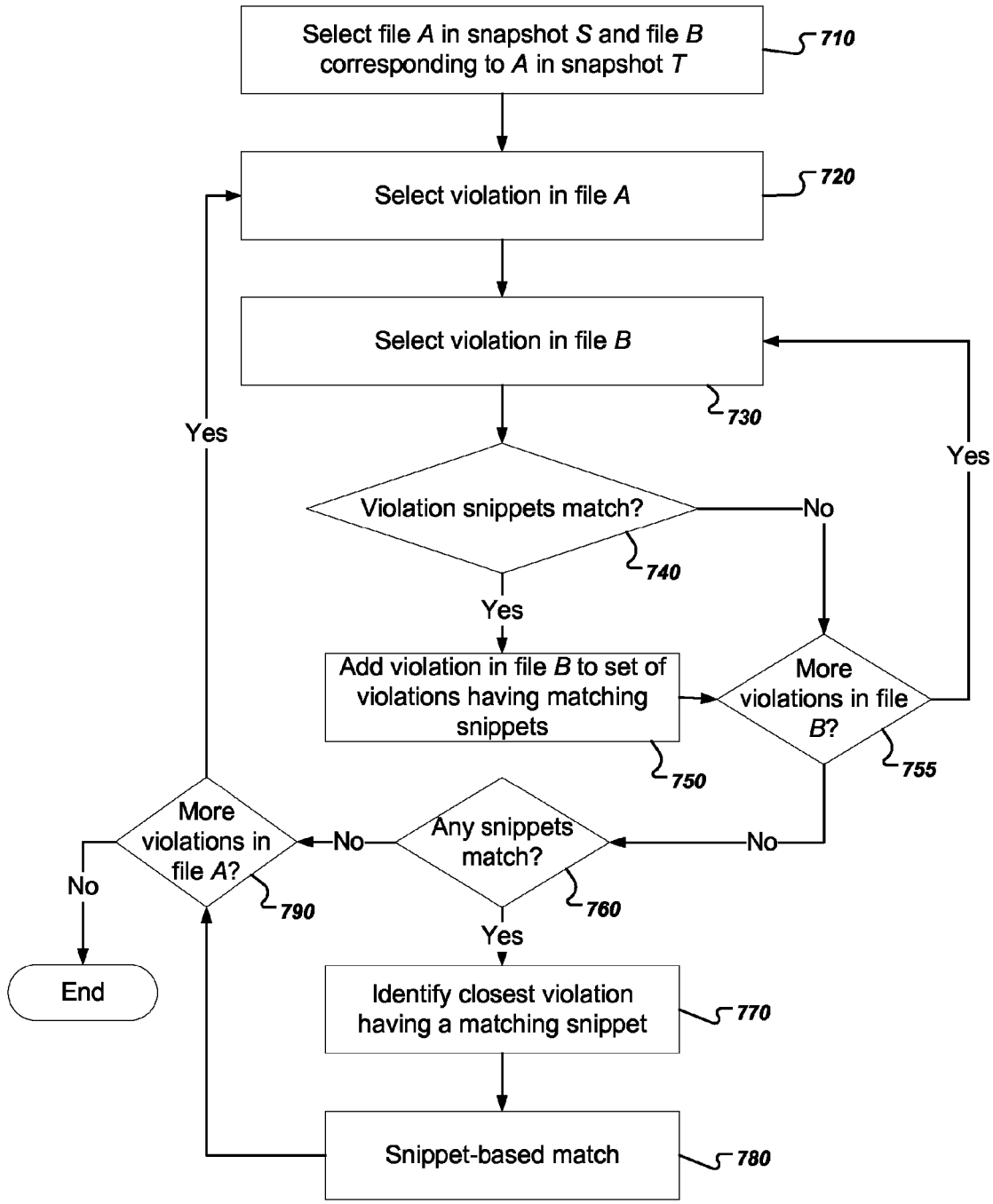
FIG. 7 is a flow chart of an example process for determining snippet-based matches.

FIG. 7 is a flow chart of an example process for determining snippet-based matches. The process will be described as being performed by an appropriately programmed system of one or more computers, e.g., the violation matching engine 120 of FIG. 1.

The system selects a file A in the snapshot S and a file B corresponding to A in the snapshot T having a matching path (710). Thus, if a file in the snapshot S or the snapshot T does not have a corresponding file with a matching path in the other snapshot, the system can skip the file. The system may also skip corresponding pairs of files if neither or only one of the files includes violations.

The system selects a violation in the file A (720). As described above with reference to FIG. 5, the system can iterate over violations in the file A, comparing each violation in the file A to each other violation in the file B.

Thus, the system selects a violation in the file B (730).

The system determines whether the violation snippets match (740). In other words, the system compares the source code delimited by the location l of each selected violation to determine whether the violations can be a snippet-based match.

Violation snippets match if the source code delimited by the respective location l of the violations is identical. If the location l designates multiple segments of source code, the system can require that each of the corresponding segments of source code to be identical in order for the violation snippets to match. The system may also concatenate the source code from multiple segments of the violation snippets into single strings and compare the strings to determine whether the violation snippets match.

In some implementations, the system does not require the violations snippets to be identical in order for violation snippets to match. The system can use fuzzy matching and approximate string matching techniques to find violation snippets that are similar but not identical. For example, the system can consider two violation snippets to be a fuzzy match if they are identical apart from white space and comments. The system can also consider violation snippets to be a fuzzy match if the violation snippets are calls to identical functions without considering argument names of the function calls. The system can also consider violation snippets to be a fuzzy match if the violations are both declarations of variables. The system can also consider the violations to be a fuzzy match if the violations both correspond to a same non-terminal or a same terminal in a formal representation of a source code programming language, e.g., a Backus-Naur representation.

The system can also use semantic-based matching techniques, for example, by comparing a location of the violations in an abstract syntax tree. In other words, if the violations have similar locations in the abstract syntax tree or if they correspond to identical subtrees in respective abstract syntax trees, or both, the system can consider the violation snippets to be a fuzzy match.

In terms of the example in FIG. 6, the violation snippet "apples.contains(orange)" is identical for both the line range 601 and the line range 632. Thus, the system can designate the violations as a snippet-based match, even though the violations occur in different locations in their respective files and even though the line range 601 is not identical to the line range 632.

As shown in FIG. 7, if the violation snippets match, the system adds the violation from the file B to set of violations having matching snippets so that the system can choose among potentially multiple violations having matching snippets (branch to 750). The system then determines whether there are more violations in the file B (755).

If the violation snippets did not match, the system determines whether there are more violations in the file B for comparison (branch to 755). If so, the system selects a next violation from the file B (branch to 730).

If the system has analyzed all violations in the file B, the system determines whether any violations having matching snippets were found (branch to 760). If not, the system does not determine any snippet-based matches for the selected violation and determines whether there are more violations from the file A (branch to 790).

If there were violations having matching snippets found, the system identifies a closest violation having an identical snippet (branch to 770). In other words, the system determines which violation, among the set of violations having identical snippets, has a location closest to the location of the selected violation from the file A. The system may skip this determination if only a single violation having a matching snippet was found.

The system then designates the closest violation having a matching snippet as a snippet-based match (780). The system can then repeat the process for all pairs of corresponding files between the snapshot S and the snapshot T.

As shown in FIG. 4A, the system adds the snippet-based matches to a set of matching violations (450) and removes them from the collection of violations. Once all unmatched violations have been analyzed using location-based matching tests, snippet-based matching tests, or both, the system determines hash-based matches (460).

Figure 8:
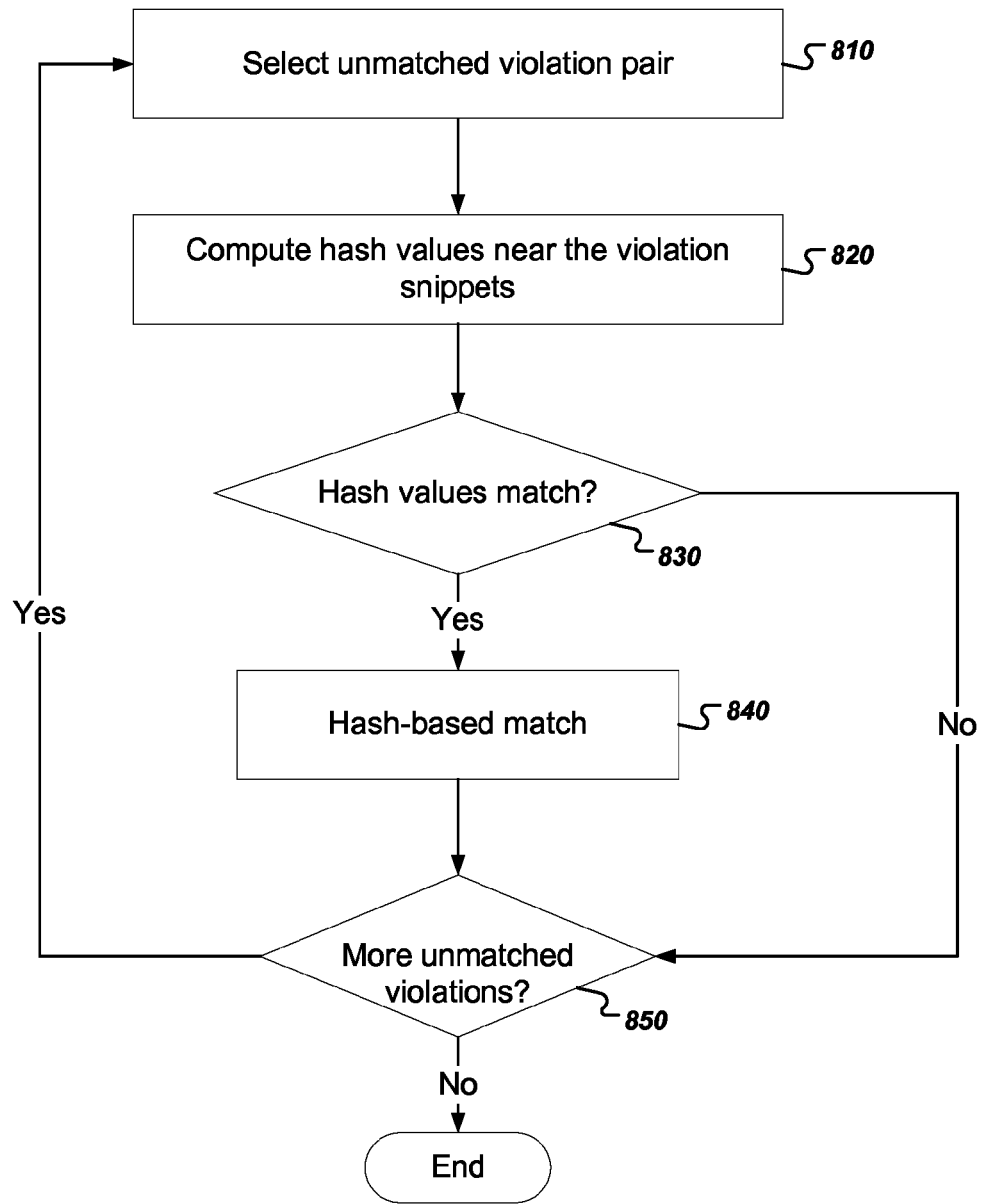
FIG. 8 is a flow chart of an example process for determining hash-based matches.

FIG. 8 is a flow chart of an example process for determining hash-based matches. Hash-based matching tests compute hash values from tokens in the source code file. A token in this context is a programming-language-dependent sequence of non-whitespace or non-comment characters of the source code file, e.g., variable names, keywords, string literals, and separators. In some implementations, only the types of some of the tokens are considered rather than their actual text. For example, a hash-matching process can match code even when variables have been renamed by hashing the string "variable name" wherever a variable name occurs rather than hashing a specific variable name. A hash value computed for a sequence of N tokens in a first file will match a hash value computed for a sequence of the same N tokens in a second file. Thus, violations need not occur in corresponding files or in files having a same path in order to be hash-based matches. In particular, hash-based matches can match violations that were moved from one file to another between the snapshot S and the snapshot T. The process will be described as being performed by an appropriately programmed system of one or more computers, e.g., the violation matching engine 120 of FIG. 1.

The system selects an unmatched violation pair (810). In general, because violations can be hash-based matches even if occurring in files having different paths or in files that do not correspond to one another, the system can compare each unmatched violation in the snapshot S to each unmatched violation in the snapshot T, or vice versa.

The system computes hash values for token sequences near the violation (820). For each violation of the selected pair, the system can compute multiple hash values using different token window sizes and positions.

For example, the system can compute a beginning hash value. The beginning hash value is a hash value computed using a token window that is generally positioned at the start of the violation snippet. For example, the token window can begin a particular number of tokens before the violation snippet and end with a first token of the violation snippet. Thus, the token window will generally include at least the beginning of the violation snippet. However, the system may also start the token window for the beginning hash value a number of tokens before or after the beginning of the violation snippet.

Similarly, the system can compute an ending hash value using a token window that is generally positioned at the end of the violation snippet. For example, the token window can begin with the last token of the violation snippet and end a particular number of tokens after the violation snippet. Thus, the token window will generally include at least the ending of the violation snippet. As with the beginning hash value, the system can start the token window for the ending hash value a number of tokens before or after the end of the violation snippet.

Likewise, the system can compute hash values using different token window sizes and positions relative to the respective violation. The system can also use token windows having different sizes depending on a type of the violation being matched. In some implementations, the system uses token windows having a fixed threshold size, e.g., 10 tokens, 75 tokens, or 200 tokens. The hash values can be computed using any convenient hashing algorithm.

In some implementations, the hash value is computed using a rolling hash function, e.g., the Rabin-Karp rolling hash, in which the hash value is computed using a fixed window of tokens in the sequence. For violations that occur near the beginning or the end of a source code file, the beginning hash value or the ending hash value may be undefined. The system can thus disregard undefined hash values. The system may also crop the token window accordingly to accommodate the beginning or the endings of a source code file. The system can also adjust the token windows at the beginning or end of the files to use the first or last token windows available for a particular token window size.

The system determines whether any of the hash values match (830). If any of the computed hash values matching between the snapshot S and the snapshot T, the system determines that the violations are a hash-based match (branch to 840).

Otherwise, the system determines whether there are more unmatched violations to be tested (branch to 850).

If there are more pairs of unmatched violations to be tested, the system selects a next pair of unmatched violations (branch to 810).

As shown in FIG. 4A, the system adds the hash-based matches to a set of matching violations (470) and removes them from the collection of violations.

After determining all pairs of matching violations, the system can determine unmatched violations and attribute the unmatched violations. As described above with reference to FIG. 2A, the system typically attributes status changes of violations to the snapshot T or to the developer responsible for the snapshot T.

Figure 4B:
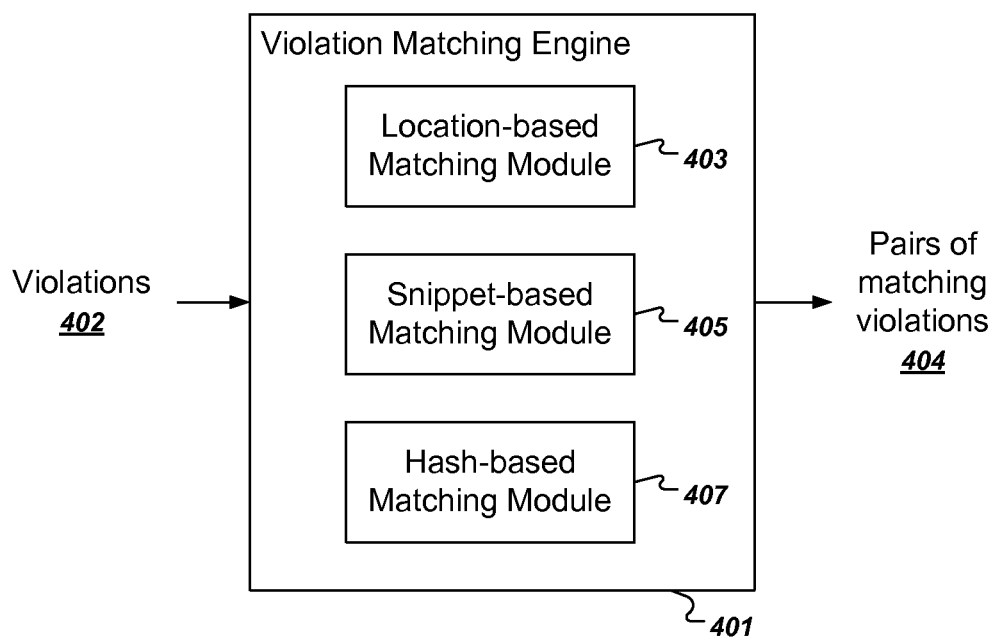
FIG. 4B is a block diagram of an example violation matching engine.

FIG. 4B is a block diagram of an example implementation 401 of a violation matching engine 120. This violation matching engine implementation 401 includes a location-based matching module 403, a snippet-based matching module 405, and a hash-based matching module 407. The violation matching engine implementation 401 receives violations 402 and generates pairs of matching violations 404. The modules each implement any one the location-based matching, snippet-based matching, or hash-based matching processes, respectively, described in this specification.

Figure 9:
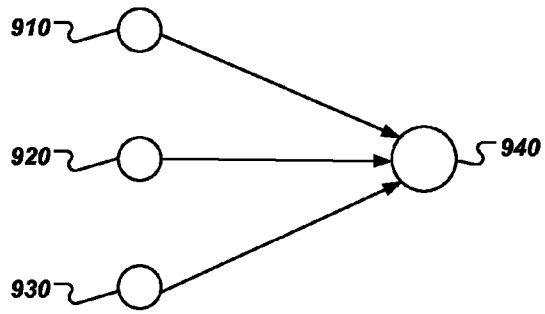
FIG. 9 is a diagram of a revision graph that shows a merge commit.

FIG. 9 is a diagram of a revision graph that shows a merge commit. A system can attribute violations in merge commit in a different way than for other, single-parent commits.

A merge commit occurs when changes from multiple parent snapshots are merged into a child snapshot. In FIG. 9, the snapshot 940 has three parent snapshots, a first parent snapshot 910, a second parent snapshot 920, and a third parent snapshot 930.

Figure 10:
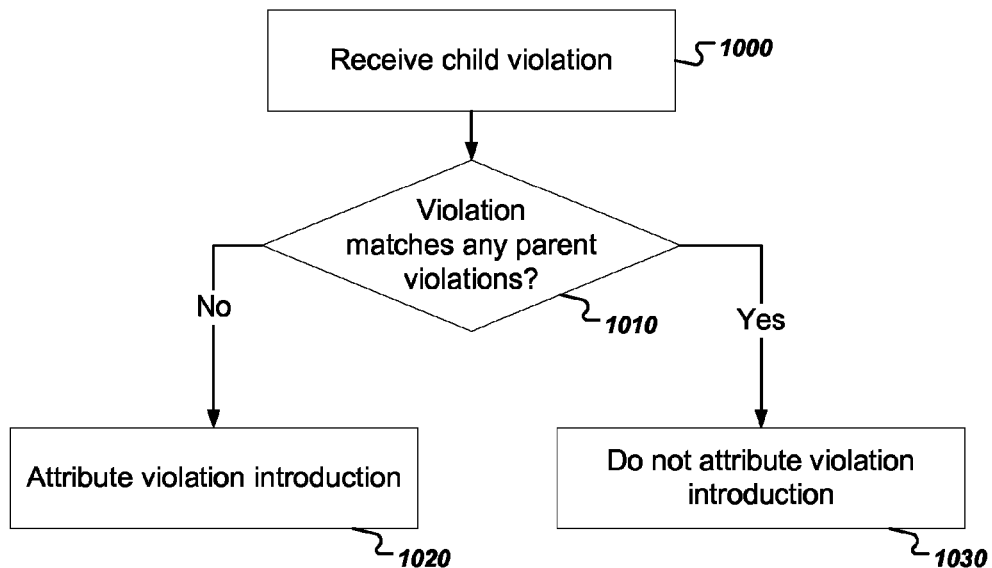
FIG. 10 is a flow chart of an example process for attributing introduced violations in a merge commit.

FIG. 10 is a flow chart of an example process for attributing introduced violations in a merge commit. The process will be described as being performed by an appropriately programmed system of one or more computers, e.g., the attribution engine 130 of FIG. 1.

The system receives a child violation (1000). A child violation represents a violation that is present in the child snapshot.

The system determines whether the violation matches any parent violation or violations of the multiple parent snapshots (1010). If the child violation does match a parent violation, the system does not attribute the violation introduction to the child snapshot or to a particular developer (branch to 1030).

On the other hand, if the child violation does not match any parent violations, the system can attribute the child violation introduction to the child snapshot or to a developer responsible for the child snapshot (branch to 1020).

Figure 11:
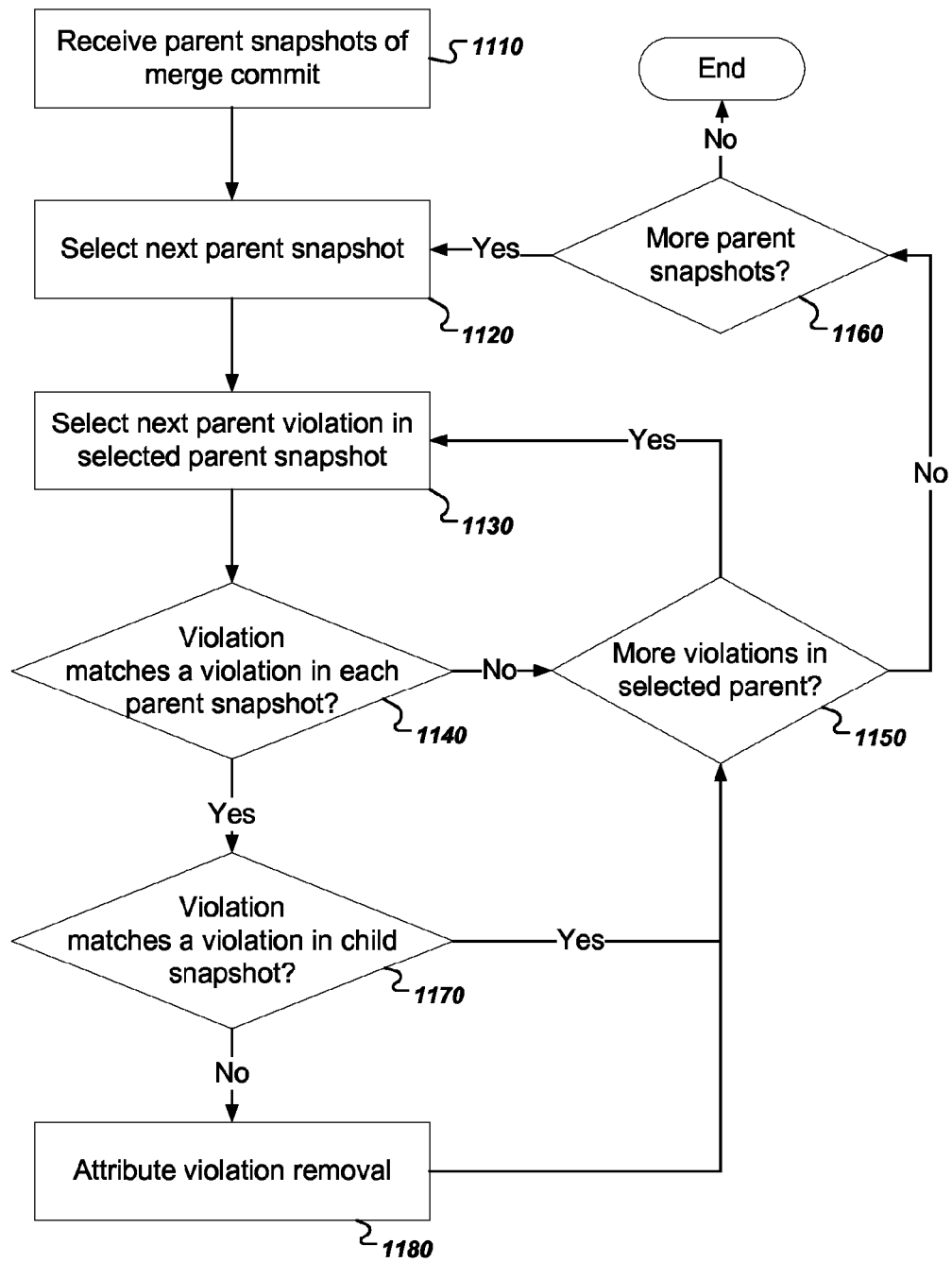
FIG. 11 is a flow chart of an example process for attributing removed violations in a merge commit.

FIG. 11 is a flow chart of an example process for attributing removed violations in a merge commit. The process will be described as being performed by an appropriately programmed system of one or more computers, e.g., the attribution engine 130 of FIG. 1.

The system receives parent snapshots of a merge commit (1110). In general, the system will iterate over each parent snapshot as a starting point to attempt to identify a violation that matches a violation in all parent snapshots. In general, violation matching may not be a transitive relationship. For example, a system may start with a first violation v1 in a first parent snapshot. The first violation v1 may match a second violation v2 in a second parent snapshot, but may not match any violations in a third parent snapshot. The system can thus start the process again with v2, as it is possible that v2 will match violations in both the first and third parent snapshots, even though v1 did not.

The system selects a next parent snapshot (1120). In general, the system will search each parent snapshot for violations that have a match in each other parent snapshot.

The system selects a next violation in the selected parent snapshot (1130). Within the selected parent snapshot, the system will iterate over violations to try to find violation match each other parent snapshot.

The system determines whether the selected parent violation has a matching violation in each other parent snapshot (1140). If the parent violation does not have a matching violation in each of the other parent snapshots, the system determines whether there are more violations within the selected parent snapshot (branch to 1150).

If so, the system selects a next parent violation in the selected parent snapshot (branch to 1130).

If not, the system determines whether there are more parent snapshots (branch to 1160). If there are more parent snapshots, the system selects a next parent snapshot (branch to 1120). If not, the process ends.

If the selected parent violation does have a matching violation in each of the other parent snapshots, the system determines whether the parent violation also matches a violation in the child snapshot (branch to 1170). If the parent violation also matches a violation in the child snapshot, the system does not attribute a status change for the violation and determines whether there are more violations in the selected parent snapshot (branch to 1150).

If the parent violation does not match a violation in the child snapshot, the system attributes a violation removal to the child snapshot or to the developer responsible for the child snapshot (branch to 1180). The system can then determine whether there are more violations in the selected parent snapshot (1150).

Figure 12:
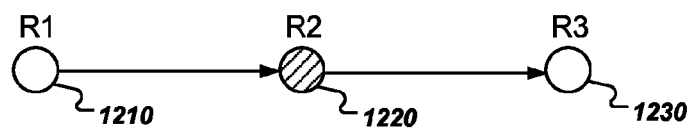
FIG. 12 is a diagram of a revision graph having an unanalyzable snapshot.

FIG. 12 is a diagram of a revision graph having an unanalyzable snapshot. Some snapshots may not be analyzable by a static analysis system. For example, the snapshot may rely on missing libraries or other dependencies. Thus, the system may attribute violations in snapshots having one or more unanalyzable parents in a different way than violations in other snapshots.

The revision graph in FIG. 12 has three snapshots, a first snapshot R1 1210, a second later snapshot R2 1220, and a third even later snapshot R3 1230. The snapshot R2 is an unanalyzable snapshot. Thus, the system may only be able to compute matching violations between R1 1210 and R3 1230.

Figure 13:
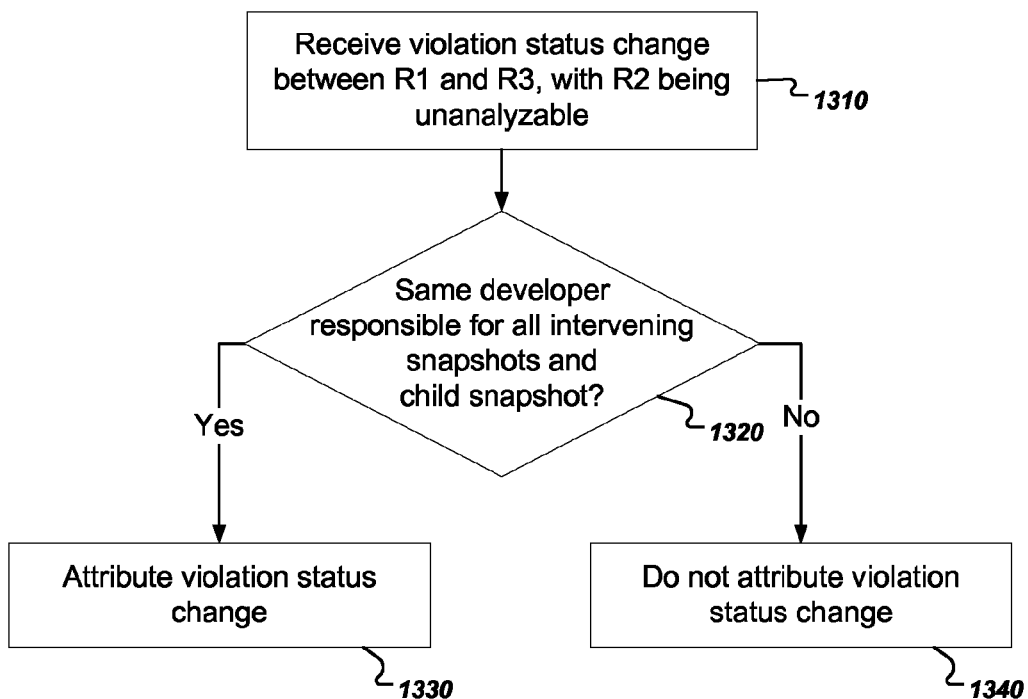
FIG. 13 is a flow chart of an example process for attributing violation status changes for a revision graph having an unanalyzable snapshot.

FIG. 13 is a flow chart of an example process for attributing violation status changes for a revision graph having an unanalyzable snapshot. The process will be described as being performed by an appropriately programmed system of one or more computers, e.g., the attribution engine 130 of FIG. 1.

The system receives a violation status change between a first snapshot R1 and a third snapshot R3 with an intervening unanalyzable snapshot R2 (1310). The system may also receive any number of unanalyzable snapshots between R1 and R3 in the revision graph.

The system determines whether a same developer or group of developers was responsible for all intervening snapshots and the child snapshot (1320). If the same developer was responsible, in that sense, for all intervening snapshots and the child snapshot, the system does attribute the violation status change to the developer (branch to 1330). If not, the system does not attribute the violation status change (branch to 1340).

The system can be implemented to generalize this approach further. In a revision graph having a sequence of snapshots by the same developer, the system can attribute violation status changes to the developer as long as the last snapshot in the sequence is analyzable. The system can attribute violation status changes to this developer, even if one or more snapshots in the sequence are unanalyzable.

Figure 14:
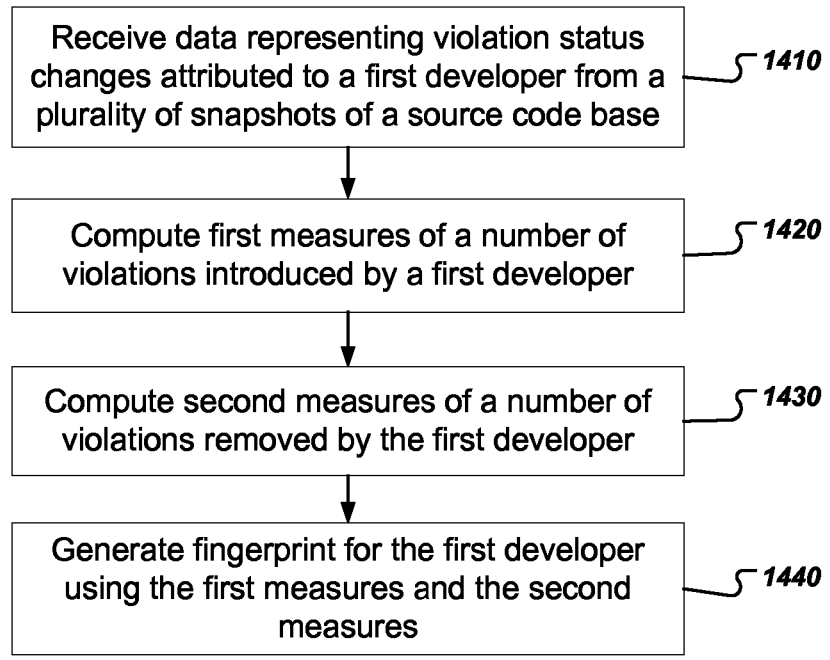
FIG. 14 is a flow chart of an example process for generating a developer fingerprint.

FIG. 14 is a flow chart of an example process for generating a developer fingerprint. In general, a system receives data representing violation status changes attributed to an individual developer in each snapshot of one or more snapshots of a source code base. The system can then generate a fingerprint that is representative of the types of status changes typically introduced by the developer and typically removed by the developer. The process can be implemented by one or more computer programs installed on one or more computers. The process will be described as being performed by an appropriately programmed system of one or more computers, e.g., the fingerprinting engine 180 of FIG. 1.

The system receives data representing violation status changes attributed to a first developer from a plurality of snapshots of a source code base (1410). The system can first analyze snapshots of a particular source code base in order to identify violations in the source code. The system can then attribute violation status changes between the snapshots to individual developers, e.g., as described above.

The system computes respective first measures of a number of violations of each type introduced by a first developer (1420). Each violation status change that was attributed to the first developer has a particular type. Thus, for each type, the system can compute a count of a number of violations of that type that the developer introduced, according to the attributed violation status changes.

The system computes respective second measures of a number of violations of each type removed by the first developer (1430). Similarly, the system can compute a count of a number of violations of each type that the developer removed between snapshots, according to the attributed violation status changes.

In some implementations, the system can compute measures of violation status changes at different levels of type granularity. In other words, the system can count together some violations that fall under a same violation category. For example, a system can group violations that relate to the coding standard "Initialize fields before use" with violations that relate to the coding standard "Make fields private" under the general type category "Fields."

The system can also augment the developer fingerprint with data elements that represent coarser, category-based measures of violation status changes. For example, the system can include a data element for the generate type category "Fields," which represents violations for multiple coding standards including "Initialize fields before use" as well as "Make fields private." The system may also generate additional data elements for the fingerprint that represent a number of total violations introduced and a number of total violations removed that are attributed to the developer.

The system generates a fingerprint for the first developer using the first measures and the second measures (1440). The system can generate the fingerprint using any appropriate data structure, e.g., a vector in which each element of the vector represents a different violation type, and where the value of each data element corresponds to the measures computed by the system. The system can also generate distinct vectors, one for violations introduced and one for violations removed.

For example, the system can determine that the first developer has introduced 10 violations of a first type and 5 violations of a second type, while removing 1 violation of the first type and 2 violations of a second type. The system can then generate a fingerprint that includes a first vector of types of violation introductions (10, 5) and a second vector of types of violation removals (1, 2). The fingerprint may thus be represented as a vector of vectors, or ((10,5), (1,2)).

The system can also scale the raw violation status change counts in a number of ways. Scaling the raw counts can result in a fingerprint that is a time-invariant characteristic of a particular developer. In other words, the fingerprint can be a characteristic that does not depend on how much time the developer has spent working on the code base, or how much code the developer has added or changed.

For example, the system can scale the raw counts by a measure of churn. Churn is a measure of a number of lines of code changed by the developer in the code base. Thus, if the first developer changed 100 lines of code, the system can scale the fingerprint according to churn by dividing each measure of violations introduced or removed by the measure of churn, resulting in the fingerprint ((0.1, 0.05), (0.01, 0.02)). Scaling by churn can be useful when comparing one developer to another.

The system can also scale the raw counts by total number of violations introduced or removed by the developer. Thus, if the first developer introduced 15 total violations and removed 3 violations, the system can generate the fingerprint ((0.667, 0.333), (0.333, 0.667)). Scaling by number of total violations introduced and removed may be more useful when using fingerprints for targeting training for developers.

Instead of computing a fingerprint for a single developer, the system may similarly compute a fingerprint for a team of developers, e.g., developers in a business unit or developers in a particular organization. The fingerprint for the team of developers will be representative of violations typically introduced and removed by the team of developers as a whole.

Figure 15:
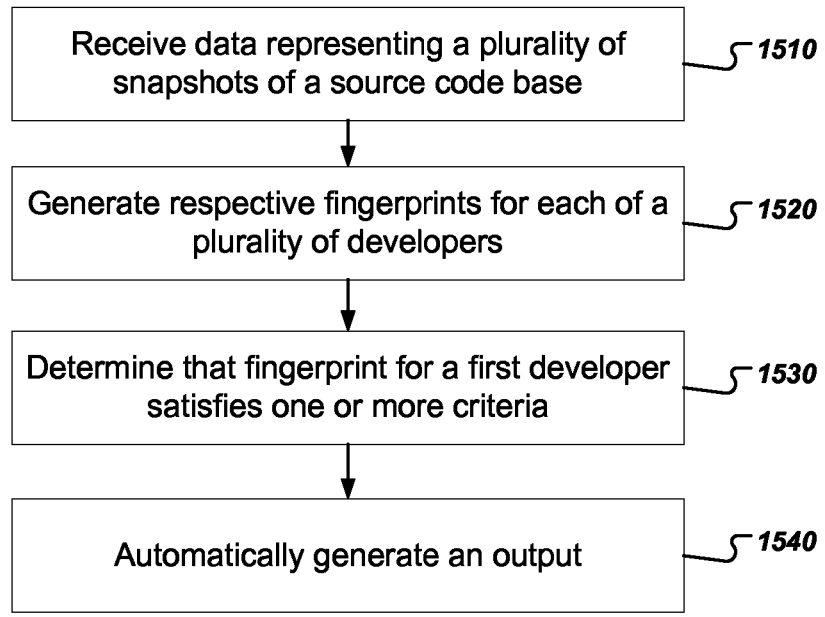
FIG. 15 is a flow chart of an example process for analyzing developer fingerprints.

FIG. 15 is a flow chart of an example process for analyzing developer fingerprints. In general, the system computes developer fingerprints for a group of developers and generates an automatic notification regarding one of the developers. The process will be described as being performed by an appropriately programmed system of one or more computers, e.g., the fingerprinting engine 180 of FIG. 1.

The system receives data representing a plurality of snapshots of a code base (1510). For example, a user can specify a plurality of snapshots of a code base for analysis. The system may also use snapshots from multiple code bases when generating fingerprints for the developers.

A user can select snapshots for analysis using a number of selection criteria. For example, a user may specify a time window for analysis, e.g., the previous three months. The system can then retrieve all snapshots from the code base that were committed within the previous three months for analysis. A user can also specify selection of snapshots that affect a particular file or a particular set of files. The system can then retrieve all snapshots that changed the file or changed any files in the specified set of files.

A user can also specify that the system select snapshots committed by a particular developer or team of developers for analysis. Thus, the user can compare developers to other developers on the same team, rather than to developers from across an entire organization.

The user may also filter out snapshots to exclude particular snapshots from analysis. For example, the user can specify a maximum churn threshold to instruct the system to disregard unusual spikes in churn. The system will thus disregard snapshots having more churn than the threshold, e.g. more than 1000 lines, 10,000 lines, or 100,000 lines changed. A user can also specify a minimum churn threshold to instruct the system to disregard snapshots having very little churn, e.g., less than 5 lines, 100 lines, or 500 lines changed. Similarly, the user can also specify a maximum violation threshold to filter out snapshots having spikes in violations introduced, and the user can specify a minimum violation threshold to filter out snapshots having few violations.

The system generates respective fingerprints for each of a plurality of developers (1520). The system can generate the fingerprints according to the process described above with reference to FIG. 14.

The system determines that a fingerprint for a first developer satisfies one or more criteria (1530). In general, the system can analyze the generated fingerprints to detect measures of violation introduction or removal that are out of the ordinary. For example, the system can determine that a first developer of the group of developers introduces concurrency violations more often or at a higher rate than any other developer. In other words, the system can compare each data element of the developer fingerprints to a respective baseline to determine whether the data element is out of the ordinary.

To do so, the system can first compute an aggregate fingerprint for the entire group of developers. For example, the system can compute the aggregate fingerprint from all violation status changes in the code base. A particular organization may also define the values for the particular aggregate fingerprint. For example, an organization can set goals for violation introductions and removals of each type and generate an aggregate fingerprint that reflects the goals set by the organization. A particular organization may also define the aggregate fingerprint to be specific to a particular programming language or problem domain.

The system can then compare each data element of a first developer's fingerprint to each data element of the aggregate fingerprint. If the difference between a pair of the data elements satisfies a threshold, the system can determine that the developer is deficient in removing or avoiding the introduction of that type of violation.

The system can also compare relative values within a single fingerprint to identify anomalies. For example, if the fingerprint indicates that a particular developer introduces a particular type of violation twice as often as other types of violations, the system can flag violations of that type as anomalous for the developer. This may be so even if the raw value for the particular violation type is otherwise within acceptable ranges for developers.

The system can also grade or rank developers in the group according to each type of violation or category of violation and generate notifications for a top number of developers of each type. The system can compute a score for each developer based on a comparison of the developer fingerprint to a reference or aggregate fingerprint. For example, the system can sum the differences between data elements of the developer's fingerprint and the reference fingerprint. The system can thus use the overall score to grade all developers in a particular group as having a passing grade based on their fingerprints, for example.

The system can also use the computed scores to rank developers. The system can compute a percentile of violation status changes overall or for particular types among all developers in the group. For example, the system can determine that a particular developer is in the 90th percentile among developers in the group for introducing concurrency violations.

The system automatically generates an output (1540). In response to determining that the fingerprint for the first developer satisfies the one or more criteria, the system can automatically report a variety of appropriate notifications.

For example, the system can generate an email notification that is communicated to the first developer as an encouragement to review coding standards on violations of that type. The system may also generate an email notification that is communicated to a team leader or group manager of the first developer, which can enable the leader or manager to help the first developer improve.

The system may also have access to a schedule of training sessions on coding standards of particular types. In response to determining that the first developer's fingerprint is out of the ordinary for violations of a particular type, the system can automatically identify a next training session that pertains to violations of that type. The system can also automatically invite the first developer to that next training session.

The system can also automatically suggest that the first developer be paired with another team member who is shown by the member's fingerprint to be more skilled in avoiding or correcting violations of that type. For example, the system can identify a second developer who rarely introduces concurrency violations, e.g., a developer who is in only the 10th percentile of developers for introducing concurrency violations. Similarly, the system can identify a second developer who often corrects concurrency violations. The system can then automatically suggest that the first developer and the second developer be placed on the same team.

The system may also automatically suggest that the second developer act as a code reviewer for the first developer. Both of these measures can help reduce the number of violations of that type introduced by the first developer and can likewise help increase the number of violations of that type that are removed by the first developer, which further helps increase the number of violations that are removed by the team as a whole.

If the system generates fingerprints for entire teams of developers, the system can assign a particular developer to a team of developers having the skills that the particular developer needs to improve. For example, if a first developer introduces concurrency violations, the system can automatically suggest that the first developer be assigned to a team of developers that has a high grade or rank for removing concurrency violations. This can encourage the first developer to improve and can improve performance of the entire organization.

Figure 16:
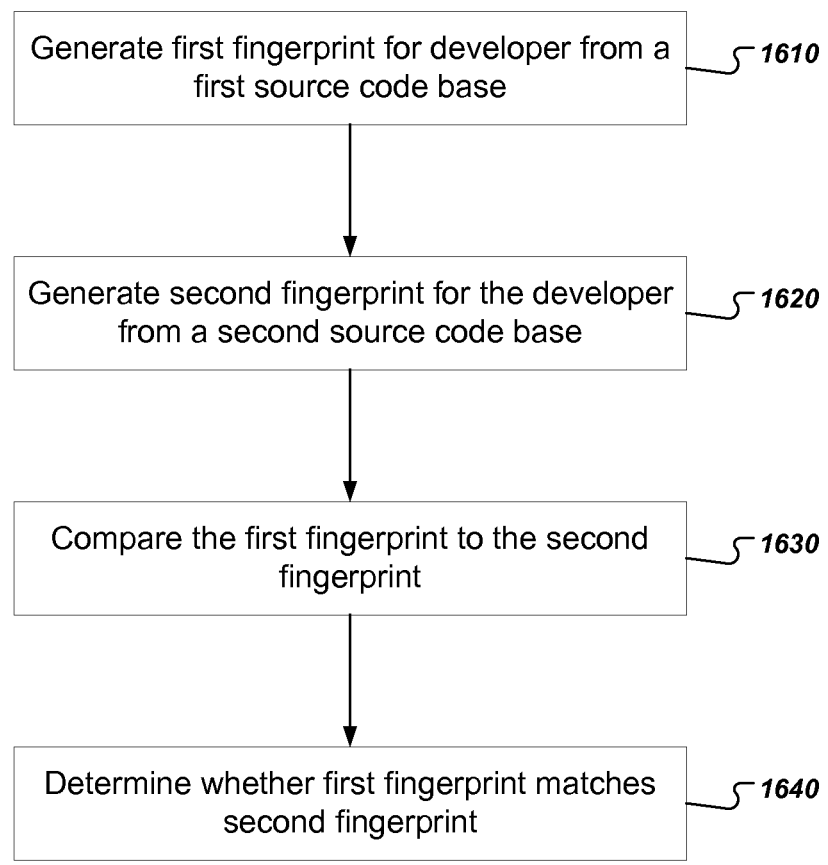
FIG. 16 is a flow chart of an example process for matching developer fingerprints.

FIG. 16 is a flow chart of an example process for matching developer fingerprints. In general, the system can compute a fingerprint for a developer from two different code bases. The system can then compare the respective fingerprints to determine a likelihood that the same developer was responsible for commits to code bases. The process will be described as being performed by an appropriately programmed system of one or more computers, e.g., the fingerprinting engine 180 of FIG. 1.

The system generates a first fingerprint for a developer from a first code base (1610), and the system generates a second fingerprint for the developer from a second code base (1620). The system can generate the fingerprints as described above with reference to FIG. 14.

The system compares the first fingerprint to the second fingerprint (1630). The system can use any appropriate similarity or distance function to compare the fingerprints, e.g., a vector similarity, an $L^1$ distance, an $L^2$ distance, or an $L^\infty$ distance, to name just a few examples.

The system determines whether the first fingerprint matches the second fingerprint (1640). In some implementations, the system compares the measure of fingerprint similarity or distance to a threshold and determines whether the similarity or distance satisfies the threshold. Based on the distance or similarity of the fingerprints, the system can compute a likelihood that the developer was responsible for changes in both code bases. For example, if the threshold is not satisfied, the system can determine that is unlikely that the same developer was responsible for the commits in both of the code bases.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving data representing a plurality of snapshots of a code base, including respective status changes of source code violations for each snapshot of the plurality of snapshots, wherein each status change has a violation type and represents a violation introduction or a violation removal, and wherein each status change is attributed to a respective developer entity, each developer entity being one or more developers of a plurality of developers;
   for each of one or more types:
      computing, for a first developer entity, an introduction measure of a number of violation introductions of the type attributed to the first developer entity as indicated by the plurality of snapshots; and
      computing, for the first developer entity, a removal measure of a number of violation removals of the type attributed to the first developer entity as indicated by the plurality of snapshots; and
   generating a fingerprint for the first developer entity, the fingerprint comprising data representing the introduction measure and the removal measure for each of one or more types.

2. The method of claim 1, wherein the fingerprint comprises a first vector of violation introductions, wherein each element of the first vector represents a measure of a number of violation introductions of a respective type attributed to the first developer entity.

3. The method of claim 2, wherein the fingerprint comprises a second vector of violation removals, wherein each element of the second vector represents a measure of a number of violations of a respective type removed by the first developer entity between snapshots of the code base.

4. The method of claim 1, wherein generating the fingerprint for the first developer entity comprises:
   scaling a respective value of each data element of the fingerprint for the first developer entity by a measure of churn attributable to the first developer entity.

5. The method of claim 1, wherein generating the fingerprint for the first developer entity comprises:

scaling a respective first value of each data element of the fingerprint corresponding to violations introduced by the developer entity by a measure of total violations introduced by the first developer entity; and scaling a respective second value of each data element of the fingerprint corresponding to violations removed by the developer entity by a measure of total violations removed by the first developer entity.

6. The method of claim 1, further comprising:
receiving an input specifying one or more selection criteria; and
selecting the plurality of snapshots to be snapshots committed to the code base that satisfy one or more selection criteria.

7. The method of claim 6, wherein the one or more selection criteria include one or more of:
a time window for the snapshots,
a maximum churn threshold for the snapshots,
a minimum churn threshold for the snapshots,
a maximum violation threshold for the snapshots,
a minimum violation threshold for the snapshots,
snapshots committed by a particular developer or group of developers, or
a particular file or set of files changed in the snapshots.

8. The method of claim 1, further comprising:
determining that the introduction measure or the removal measure for a first type attributed to the first developer entity has a value that satisfies a threshold; and
automatically reporting the determination.

9. The method of claim 8, wherein determining that the introduction measure for the first type attributed to the first developer entity has a value that satisfies a threshold comprises:
determining that the introduction measure is within a predetermined top percentile among corresponding measures for the plurality of developers.

10. The method of claim 8, wherein determining that the introduction measure for the first type attributed to the first developer entity has a value that satisfies a threshold comprises:
obtaining a reference fingerprint; and
determining that the introduction measure has a value that differs from a reference value of the reference fingerprint by at least a threshold value.

11. The method of claim 10, further comprising:
computing the reference fingerprint as an average fingerprint from respective fingerprints for each of the developers in the plurality of developers.

12. The method of claim 1, further comprising:
determining that the introduction measure for the first type attributed to the first developer entity has a value that indicates a need for training;
identifying a training session pertaining to the first type; and
automatically sending an invitation to the first developer entity to attend the training session pertaining to the first type.

13. The method of claim 1, further comprising:
determining that the introduction measure for the first type attributed to the first developer entity has a value that indicates a need for training;
selecting a second developer entity, the second developer entity being one or more developers of the plurality of developers, the second developer entity having a second fingerprint that represents a corresponding introduction measure or removal measure or both for the second developer entity, wherein the corresponding introduction measure or removal measure or both have values that indicates that the second developer entity has achieved at least a threshold level of performance with respect to avoiding violations of the first type, correcting violations of the first type, or both; and
providing a suggested team pairing, the team pairing including the first developer entity and the second developer entity.

14. The method of claim 13, wherein providing the suggested team pairing comprises providing a suggestion for the second developer entity to serve as a code reviewer for the first developer entity.

15. The method of claim 1, further comprising:
receiving a second plurality of snapshots of a second code base;
generating a second fingerprint for the first developer entity using status changes of source code violations for each snapshot of the second plurality of snapshots;
comparing the second fingerprint to the first fingerprint; and
determining a likelihood that the first developer entity was responsible for status changes for the second code base based on comparing the second fingerprint to the first fingerprint.

16. A system comprising:
one or more computers and one or more storage devices storing instructions that are operable, when executed by the one or more computers, to cause the one or more computers to perform operations comprising:
receiving data representing a plurality of snapshots of a code base, including respective status changes of source code violations for each snapshot of the plurality of snapshots, wherein each status change has a violation type and represents a violation introduction or a violation removal, and wherein each status change is attributed to a respective developer entity, each developer entity being one or more developers of a plurality of developers;
for each of one or more types:
computing, for a first developer entity, an introduction measure of a number of violation introductions of the type attributed to the first developer entity as indicated by the plurality of snapshots; and
computing, for the first developer entity, a removal measure of a number of violation removals of the type attributed to the first developer entity as indicated by the plurality of snapshots; and
generating a fingerprint for the first developer entity, the fingerprint comprising data representing the introduction measure and the removal measure for each of one or more types.

17. The system of claim 16, wherein the fingerprint comprises a first vector of violation introductions, wherein each element of the first vector represents a measure of a number of violation introductions of a respective type attributed to the first developer entity.

18. The system of claim 17, wherein the fingerprint comprises a second vector of violation removals, wherein each element of the second vector represents a measure of a number of violations of a respective type removed by the first developer entity between snapshots of the code base.

19. A computer program product, encoded on one or more non-transitory computer storage media, comprising instructions that when executed by one or more computers cause the one or more computers to perform operations comprising:
receiving data representing a plurality of snapshots of a code base, including respective status changes of source code violations for each snapshot of the plurality of snapshots, wherein each status change has a violation type and represents a violation introduction or a violation removal, and wherein each status change is attributed to a respective developer entity, each developer entity being one or more developers of a plurality of developers;

for each of one or more types:
- computing, for a first developer entity, an introduction measure of a number of violation introductions of the type attributed to the first developer entity as indicated by the plurality of snapshots; and
- computing, for the first developer entity, a removal measure of a number of violation removals of the type attributed to the first developer entity as indicated by the plurality of snapshots; and generating a fingerprint for the first developer entity, the fingerprint comprising data representing the introduction measure and the removal measure for each of one or more types.

20. The computer program product of claim 19, wherein the fingerprint comprises a first vector of violation introductions, wherein each element of the first vector represents a measure of a number of violation introductions of a respective type attributed to the first developer entity.

21. The computer program product of claim 20, wherein the fingerprint comprises a second vector of violation removals, wherein each element of the second vector represents a measure of a number of violations of a respective type removed by the first developer entity between snapshots of the code base.

* * * * *